(12) United States Patent
Wu

(10) Patent No.: US 9,416,899 B2
(45) Date of Patent: Aug. 16, 2016

(54) SHOCK PUMP ADAPTER

(71) Applicant: Scott Wu, Taichung (TW)

(72) Inventor: Scott Wu, Taichung (TW)

( * ) Notice: Subject to any disclaimer, the term of this patent is extended or adjusted under 35 U.S.C. 154(b) by 0 days.

(21) Appl. No.: 14/565,464

(22) Filed: Dec. 10, 2014

(65) Prior Publication Data

US 2016/0169423 A1 Jun. 16, 2016

(51) Int. Cl.
*F16K 15/20* (2006.01)
*F16L 15/08* (2006.01)
*F16L 29/00* (2006.01)
*F16F 9/43* (2006.01)

(52) U.S. Cl.
CPC . *F16L 15/08* (2013.01); *F16F 9/43* (2013.01); *F16L 29/007* (2013.01); *Y10T 137/3724* (2015.04)

(58) Field of Classification Search
CPC .................. Y10T 37/3584; Y10T 37/3724
See application file for complete search history.

(56) References Cited

U.S. PATENT DOCUMENTS

| 3,712,336 A * | 1/1973 | Bell, Jr. ............... | F16K 15/20 137/231 |
| 4,165,760 A * | 8/1979 | Guenther ............ | F16K 15/20 137/231 |
| 4,807,658 A * | 2/1989 | Patti .................... | B60C 29/064 137/223 |
| 6,220,836 B1 * | 4/2001 | Wu ....................... | F04B 33/005 137/231 |
| 6,382,268 B1 * | 5/2002 | Lin ....................... | F16K 15/20 137/231 |
| 2004/0055641 A1 * | 3/2004 | Ostrowiecki ....... | F16K 17/0413 137/223 |
| 2005/0000568 A1 * | 1/2005 | Nikolayev ........... | F16L 37/23 137/231 |

FOREIGN PATENT DOCUMENTS

TW 201319433 A 5/2013

* cited by examiner

*Primary Examiner* — R. K. Arundale
(74) *Attorney, Agent, or Firm* — Alan D. Kamrath; Kamrath IP Lawfirm, P.A.

(57) ABSTRACT

A shock pump adapter includes a communication device configured to include an inner tube and an outer tube. The inner and outer tubes are rotatable with respect to one another. A valve insert fixes to one of two ends of and is rotatable with the inner tube and includes a first channel fluidly connecting to a hollow of the inner tube. An air inlet joint fixes to the other of the two ends of and is rotatable with the inner tube. The air inlet joint includes a second channel fluidly connecting to the hollow of the inner tube and a one-way valve disposed in the second channel. An air outlet joint connects to and is disposed at the other of the two ends of the communication device. The air outlet joint fixes to and is rotatable with the outer tube.

17 Claims, 5 Drawing Sheets

SHOCK PUMP ADAPTER

BACKGROUND OF THE INVENTION

1. Field of the Invention

The present invention relates to a pump adapter and, particularly, to a shock pump adapter.

2. Description of the Related Art

TW Patent Publication No. TW201319433 shows a pump head of a pump. The pump head includes a housing, a sleeve, and a valve insert. The sleeve is disposed in the housing. The valve insert is disposed in the sleeve. In addition, the valve insert is configured to include different valve abutting ends for engagement with different types of valves. The pump head is adapted to connect to a shock absorber. Alternatively, the pump head is adapted to connect to a tire. Therefore, it is convenient for a user to use such a dualfunctional device to selectively inflate a shock absorber or a tire. Nevertheless, the pump head does not have a design that allows a shock absorber to be connected thereto easily nor can avoid structural interfere with the shock absorber during inflation.

The present invention is, therefore, intended to obviate or at least alleviate the problems encountered in the prior art.

SUMMARY OF THE INVENTION

According to the present invention, a shock pump adapter includes a communication device, a valve insert, an air inlet joint, and an air outlet joint. The communication device is configured to include an inner tube and an outer tube. The inner tube is disposed within a hollow of the outer tube. The inner and outer tubes are rotatable with respect to one another. The valve insert fixes to one of two ends of and is rotatable with the inner tube and includes a first channel fluidly connecting to a hollow of the inner tube. The air inlet joint connects to and is disposed at one of two ends of the communication device. The air inlet joint fixes to the other of the two ends of and is rotatable with the inner tube. The air inlet joint includes a second channel fluidly connecting to the hollow of the inner tube and a one-way valve disposed in the second channel. The air outlet joint connects to and is disposed at the other of the two ends of the communication device. The air outlet joint fixes to and is rotatable with the outer tube.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

It is therefore an objective of the present invention to provide a shock pump adapter that allows a shock absorber to be connected thereto easily and can avoid structural interfere with the shock absorber during inflation.

It is another objective of the present invention to provide a shock pump adapter that can engage with an air pumping device and a shock absorber without encountering structural interference by either the air pumping device or the shock absorber.

Other objectives, advantages, and new features of the present invention will become apparent from the following detailed description of the invention when considered in conjunction with the accompanied drawings.

DETAILED DESCRIPTION OF THE PREFERRED EMBODIMENTS

Figure 1:
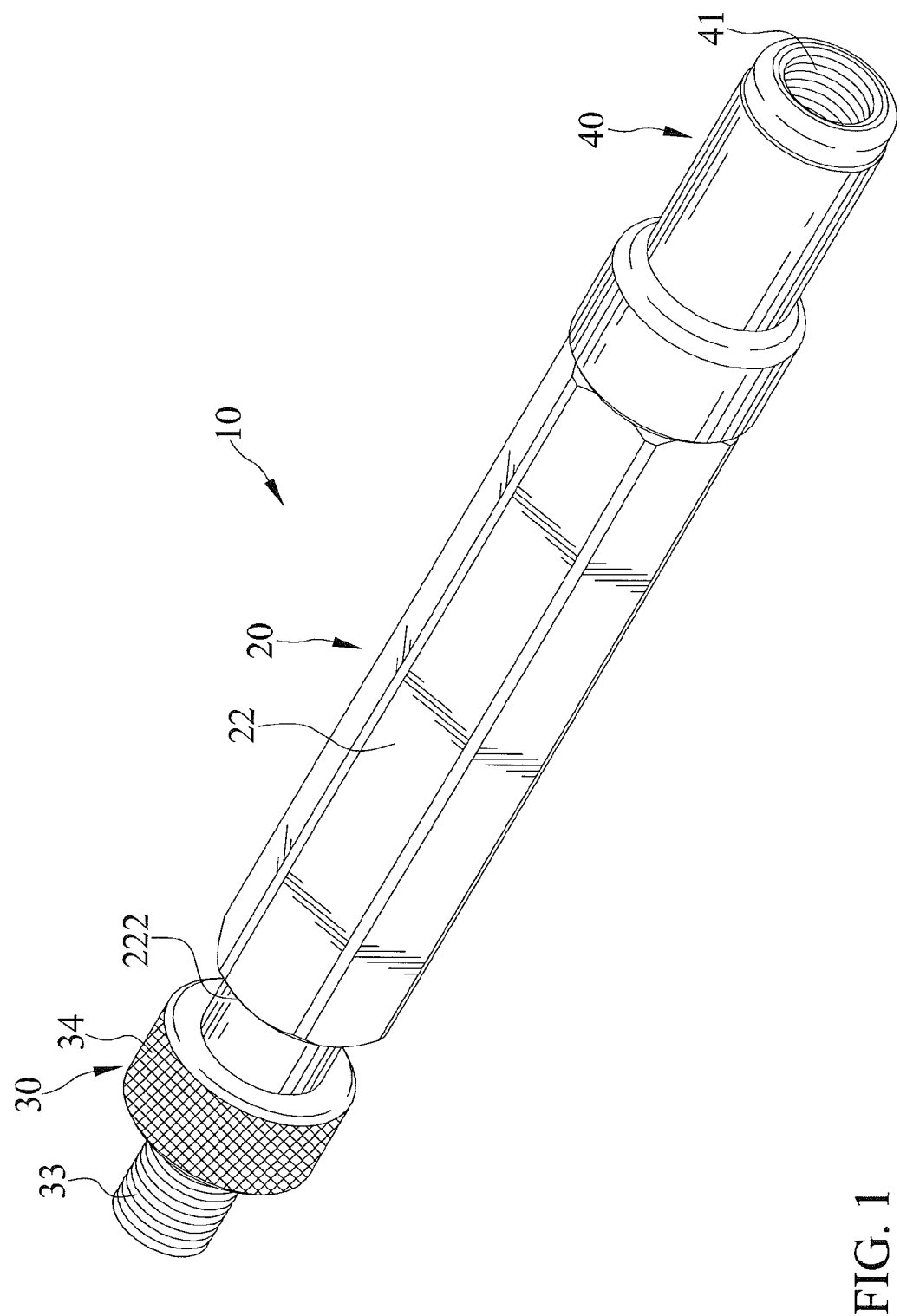
FIG. 1 is a perspective view of a shock pump adapter in accordance with a first embodiment of the present invention.
Figure 2:
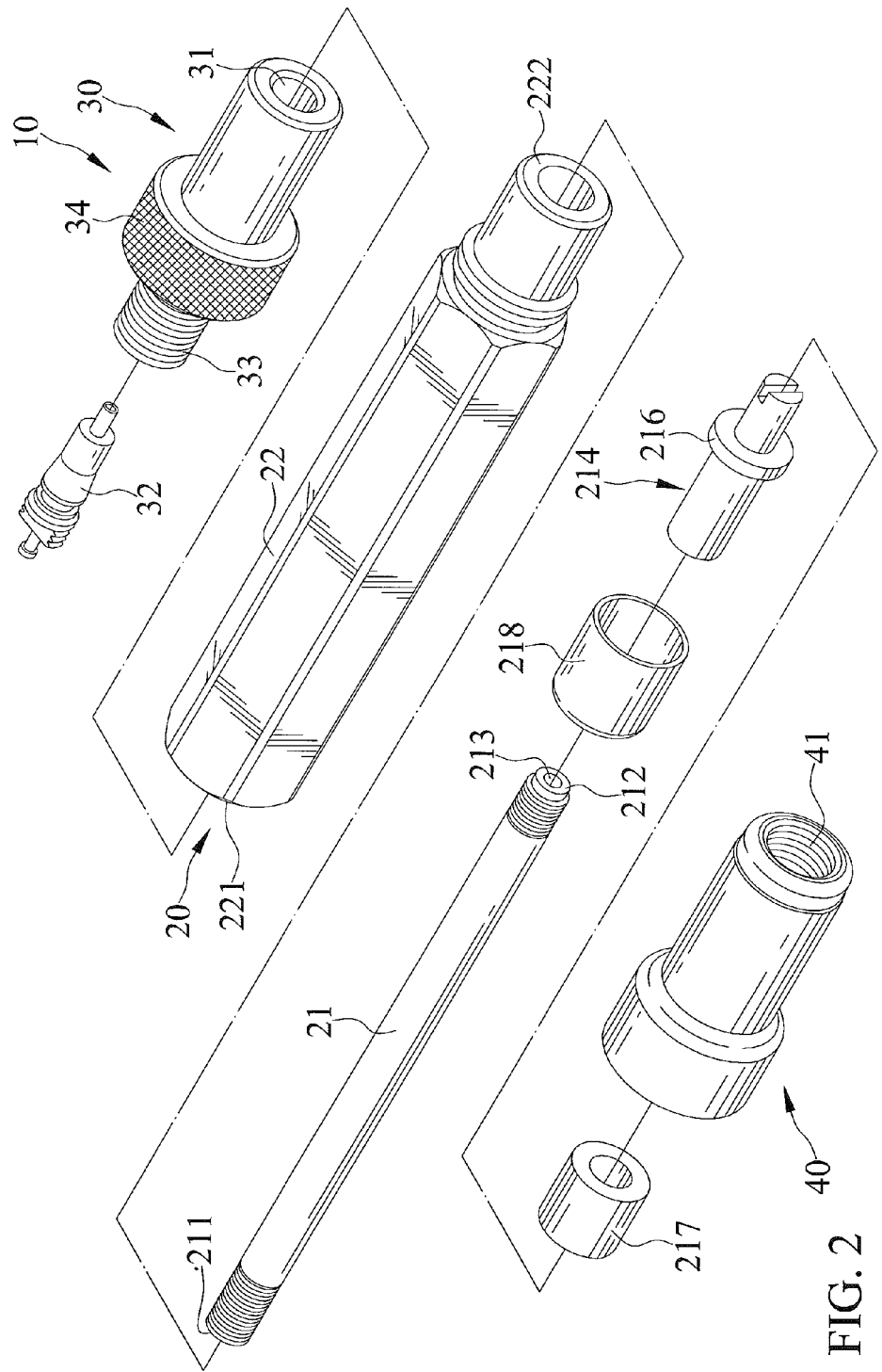
FIG. 2 is an exploded perspective view of the shock pump adapter of FIG. 1.
Figure 3:
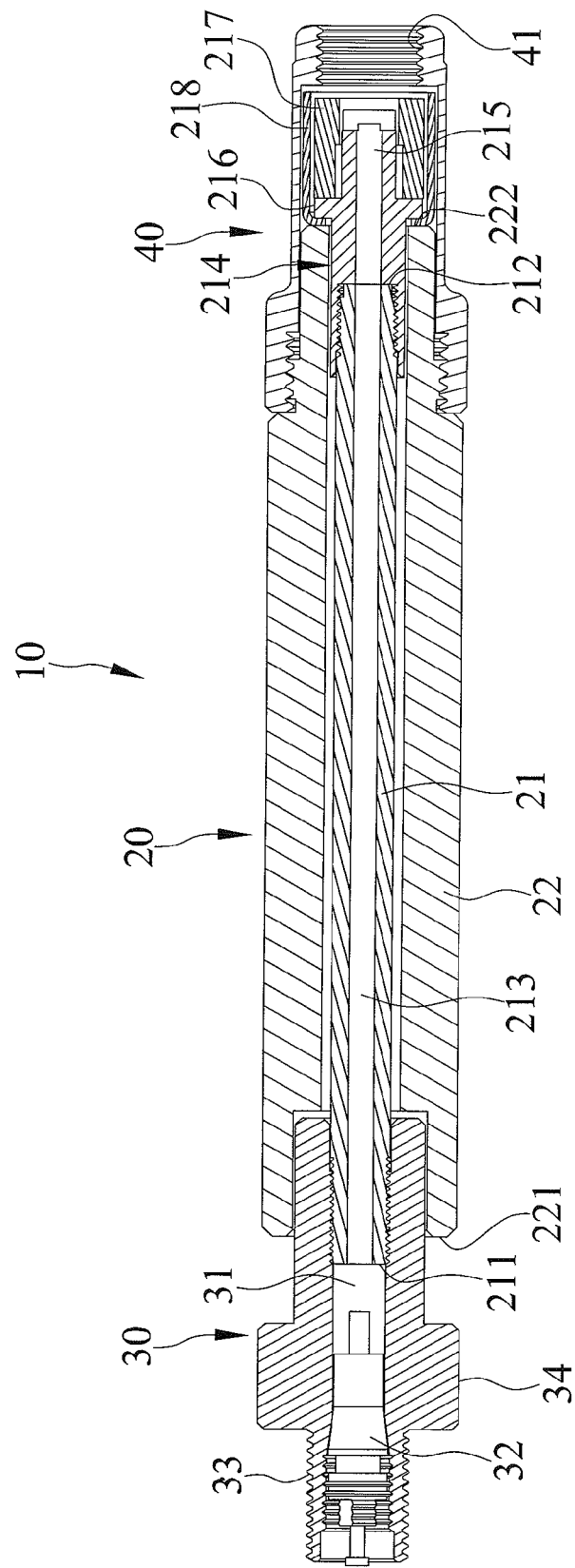
FIG. 3 is a cross-sectional view of the shock pump adapter of FIG. 1.

FIGS. 1 through 3 show a shock pump adapter 10 in accordance with a first embodiment of the present invention. The shock pump adapter 10 includes a communication device 20, a valve insert 214, an air inlet joint 30, and an air outlet joint 40.

The communication device 20 is configured to include an inner tube 21 and an outer tube 22. The inner tube 21 has a first end 211 and a second end 212 opposite the first end 211 and has a longitudinal length between the first and second ends 211 and 212 thereof. The outer tube 22 has a first end 221 and a second end 222 opposite the first end 221 and has a longitudinal length between the first and second ends 221 and 222 thereof. The inner tube 21 is disposed within a hollow of the outer tube 22. The hollow of the outer tube 22 has a first section having a first cross section and a second section having a second cross section. The second cross section of the second hollow section of the outer tube 22 is greater than the first cross section of the first hollow section of the outer tube 22. The inner tube 21 is partially disposed within the first section and partially disposed within the second section of the hollow of the outer tube 22. The inner and outer tubes 21 and 22 are rotatable with respect to one another. In addition, the inner tube 21 has a cross section smaller than the cross section of the hollow of the outer tube 22. Therefore, the inner and outer tubes 21 and 22 are adapted to be rotated relatively freely.

The valve insert 214 fixes to one of two ends of and is rotatable with the inner tube 21 and includes a first channel 215 fluidly connecting to a hollow of the inner tube 21. The valve insert 214 is partially disposed within the hollow of the outer tube 22 and partially disposed outside the hollow of the outer tube 22 and within an inner space of the air outlet joint 40. The valve insert 214 has a flange 216 which is spaced from the outer tube 22 with a gap and has a diameter greater than a diameter of the hollow of the outer tube 22.

The air inlet joint 30 connects to and is disposed at one of two ends of the communication device 20. The air inlet joint 30 fixes to the other of the two ends of and is rotatable with the inner tube 21. The air inlet joint 30 has one of two ends disposed in the second section of the hollow of the outer tube 22 and having a third cross section greater than the first cross section of the hollow of the outer tube 22. The inner tube 21 and the air inlet joint 30 are in thread engagement with one another. The inner tube 21 has an outer periphery thereof including outer threads, and the air inlet joint 30 has an inner periphery thereof including inner threads. The outer threads of the inner tube 21 and the inner threads of the air inlet joint 30 engage with one another. The inner tube 21 and the air inlet joint 30 are glued together. The inner tube 21 and the air inlet joint 30 include a glue disposed therebetween. The air inlet joint 30 includes a second channel 31 fluidly connecting to the hollow of the inner tube 21 and a one-way valve 32 disposed in the second channel 31. The air inlet joint 30 has an outer periphery thereof forming a connecting end. The connecting end of the air inlet joint 30 is configured to include outer threads 33. The air inlet joint 30 includes a grip 34 disposed outside the hollow of the outer tube 22. The grip 34 allows a user to grasp to facilitate engagement with the inner tube 21. The grip 34 has a cross section greater than the first cross section of the hollow of the outer tube 22. The grip 34 is disposed between the connecting end and the one of the two ends of the air inlet joint 30. The grip 34 has an anti-slip surface formed thereon. The grip 34 includes the anti-slip surface knurled.

The air outlet joint 40 connects to and is disposed at the other of the two ends of the communication device 20. The air outlet joint 40 fixes to and is rotatable with the outer tube 22. The outer tube 22 and the air outlet joint 40 are in thread engagement with one another. The outer tube 22 has an outer periphery thereof including outer threads, and the air outlet joint 40 has an inner periphery thereof including inner threads. The outer threads of the outer tube 22 and the inner threads of the air outlet joint 40 engage with one another. The outer tube 22 and the air outlet joint 40 are glued together. The outer tube 22 and the air outlet joint 40 include a glue disposed therebetween.

The air outlet joint 40 has an inner periphery forming a connecting end. The connecting end of the air outlet joint 40 is configured to include inner threads 41.

The valve insert 214, the inner tube 21 and the air inlet joint 30 are disposed sequentially axially.

The air inlet joint 30 is rotatable with the inner tube 21, the air outlet joint 40 is rotatable with the outer tube 22, and the inner tube 21 is rotatable relative to the outer tube 22.

Further, a seal 217 and a sleeve 218 are disposed outside the hollow of the outer tube 22 and within an inner space of the air outlet joint 40. The seal 217 extends annularly and has a hole extending therethrough and including a section of the valve insert 214 disposed outside the hollow of the outer tube 22 restrained therein. The flange 216 bears one of two ends of the seal 217, with the one of two ends of the seal 217 abutting the flange 216. The sleeve 218 extends annularly and has an inner space including the seal 217 restrained therein. The sleeve 218 is restrained between the valve insert 214 and the outer tube 22. The sleeve 218 has an end thereof forming a catching structure engaging in the gap. The catching structure extends radially with respect to a longitudinal length of the sleeve 218.

In use of the shock pump adapter 10 to fluidly adapt an air pumping device and a shock absorber, the air pumping device is secured to the connecting end of the air inlet joint 30 and the shock absorber is secured to the connecting end of the air outlet joint 40 respectively, the second channel 31 fluidly connects to the air pumping device, and the first channel 215 fluidly connects to the shock absorber. Therefore, air from the air pumping device is able to flow through the second channel 31, the hollow 213, and the first channel 215 consecutively into the shock absorber. In addition, the one-way valve 32 has an end thereof forming a protrusion abutting against a valve core of the air pumping device in order to allow air flow from the air pumping device into the second channel 31.

Preferably, the air pumping device and the air inlet joint 30 are rotatably engaged together, and the shock absorber and the air outlet joint 40 are rotatably engaged together. Since the air inlet joint 30 is rotatable with the inner tube 21, the air outlet joint 40 is rotatable with the outer tube 22, and the inner tube 21 is rotatable relative to the outer tube 22, rotating the air outlet joint 40 and the shock absorber relative to one another will not cause the air pumping device installed to the air inlet joint 30 to rotate or rotating the air inlet joint 30 and the air pumping device relative to one another will not cause the shock absorber installed to the air outlet joint 40 to rotate. Therefore, it is more convenient and free to engage the air pumping device with the air inlet joint 30 and to engage the shock absorber with the air outlet joint 40.

Figure 4:
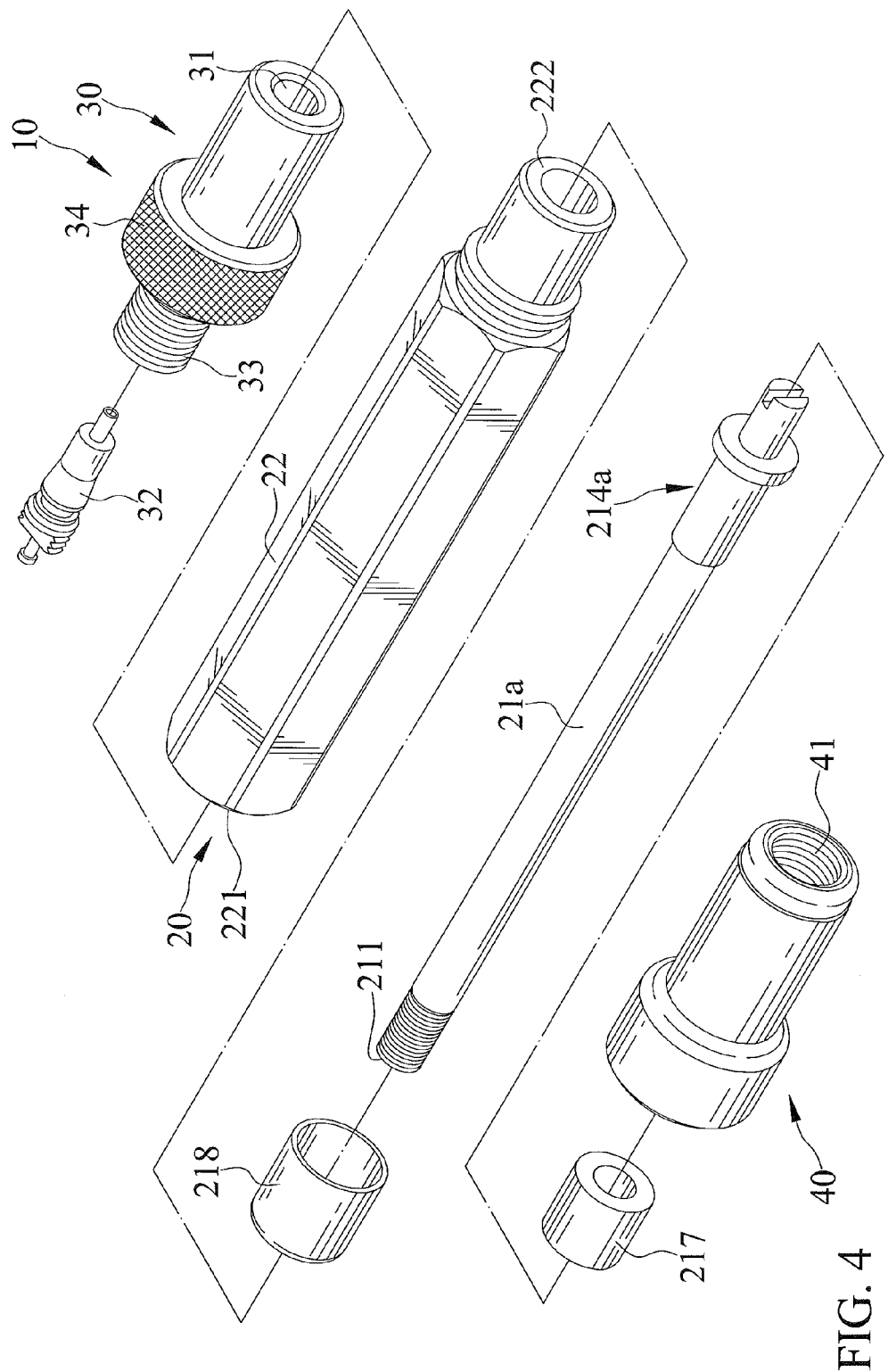
FIG. 4 is an exploded perspective view of a shock pump adapter in accordance with a second embodiment of the present invention.
Figure 5:
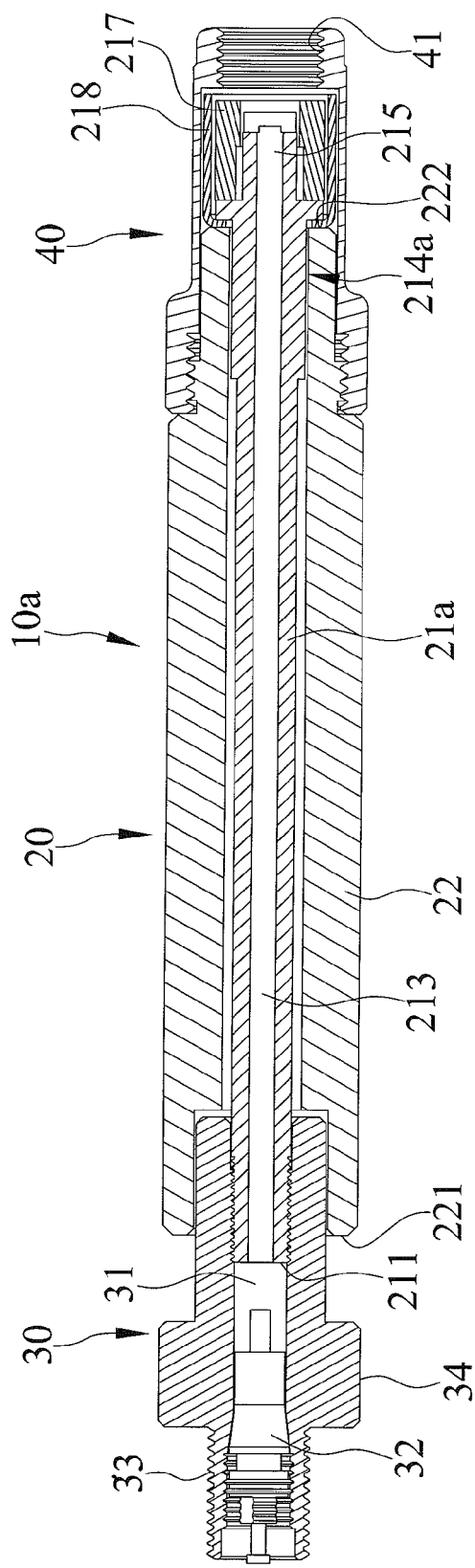
FIG. 5 is a cross-sectional view of the shock pump adapter of FIG. 4.

FIGS. 4 and 5 show a shock pump adapter 10a in accordance with a second embodiment of the present invention. The shock pump adapter 10a is the same as the shock pump adapter 10 except that an inner tube 21a and a valve insert 214a are of one-piece construction and made from the same material. Therefore, the inner tube 21a and the valve insert 214a are not subject to separating from one another inadvertently.

In view of the foregoing, the air inlet joint 30 is rotatable with the inner tube 21 or 21a, the air outlet joint 40 is rotatable with the outer tube 22, and the inner tube 21 is rotatable relative to the outer tube 22. Therefore, when the air pumping device with the air inlet joint 30 are rotatably engaged together, it is still easy and free to rotatably engage the shock absorber with the air outlet joint 40. In addition, the valve inserts 214 and 214a is rotatable with the associated inner tubes 21 and 21a engaged therewith.

The foregoing is merely illustrative of the principles of this invention, and various modifications can be made by those skilled in the art without departing from the scope and spirit of the invention.

What is claimed is:

1. A shock pump adapter comprising:
a communication device configured to include an inner tube and an outer tube, with the inner tube disposed within a hollow of the outer tube, and with inner and outer tubes being rotatable with respect to one another, wherein the hollow of the outer tube has a first section having a first cross section and a second section having a second cross section greater than the first cross section;
a valve insert fixing to one of two ends of and being rotatable with the inner tube and including a first channel fluidly connecting to a hollow of the inner tube;

an air inlet joint connecting to and disposed at one of two ends of the communication device, with the air inlet joint fixing to the other of the two ends of and being rotatable with the inner tube, with the air inlet joint including a second channel fluidly connecting to the hollow of the inner tube and a one-way valve disposed in the second channel, wherein the air inlet joint has one of two ends disposed in the second section of the hollow of the outer tube and having a third cross section greater than the first cross section; and an air outlet joint connecting to and disposed at the other of the two ends of the communication device, with the air outlet joint fixing to and being rotatable with the outer tube.

2. The shock pump adapter as claimed in claim 1, wherein the valve insert is partially disposed within the hollow of the outer tube and partially disposed outside the hollow of the outer tube and within an inner space of the air outlet joint.

3. The shock pump adapter as claimed in claim 2 further comprising a seal and a sleeve disposed outside the hollow of the outer tube and within the inner space of the air outlet joint, wherein the seal extends annularly and has a hole extending therethrough and including a section of the valve insert disposed outside the hollow of the outer tube restrained therein, and wherein the sleeve extends annularly and has an inner space including the seal restrained therein.

4. The shock pump adapter as claimed in claim 3, wherein the valve insert has a flange which is spaced from the outer tube with a gap and has a diameter greater than a diameter of the hollow of the outer tube, and wherein the sleeve is restrained between the valve insert and the outer tube, with the sleeve having an end thereof forming a catching structure engaging in the gap.

5. The shock pump adapter as claimed in claim 3, wherein the flange bears one of two ends of the seal, with the one of two ends of the seal abutting the flange.

6. The shock pump adapter as claimed in claim 1, wherein the air inlet joint has a connecting end adapted to engage with an air pumping device, and wherein the connecting end is configured to include outer threads on an outer periphery of the air inlet joint.

7. The shock pump adapter as claimed in claim 1, wherein the air outlet joint has a connecting end adapted to engage with a shock absorber, and wherein the connecting end is configured to include inner threads on an inner periphery of the air outlet joint.

8. The shock pump adapter as claimed in claim 1, wherein the inner tube and the air inlet joint are glued together, with the inner tube and the air inlet joint including a glue disposed therebetween.

9. The shock pump adapter as claimed in claim 8, wherein the inner tube and the air inlet joint are in thread engagement with one another.

10. The shock pump adapter as claimed in claim 1, wherein the inner tube and the air inlet joint are in thread engagement with one another.

11. The shock pump adapter as claimed in claim 1, wherein the outer tube and the air, outlet joint are glued together, with the outer tube and the air outlet joint including a glue disposed therebetween.

12. The shock pump adapter as claimed in claim 11, wherein the outer tube and the air outlet joint are in thread engagement with one another.

13. The shock pump adapter as claimed in claim 1, wherein the outer tube and the air outlet joint are in thread engagement with one another.

14. The shock pump adapter as claimed in claim 1, wherein the inner tube and the valve insert are of one-piece construction and made from a same material.

15. The shock pump adapter as claimed in claim 1, wherein the air inlet joint includes a grip disposed outside the hollow of the outer tube and having a cross section greater than the first cross section.

16. The shock pump adapter as claimed in claim 15, wherein the grip has an anti-slip surface formed thereon.

17. The shock pump adapter as claimed in claim 15, wherein the air inlet joint has another of the two ends forming a connecting end adapted to engage with an air pumping device, wherein the connecting end is configured to include outer threads on an outer periphery of the air inlet joint, and wherein the grip is disposed between the connecting end and the one of the two ends of the air inlet joint.

* * * * *